(12) United States Patent
Ishino et al.

(10) Patent No.: US 8,262,330 B2
(45) Date of Patent: Sep. 11, 2012

(54) FASTENING STRUCTURE, FASTENING METHOD AND FASTENING MEMBER

(75) Inventors: Keiji Ishino, Sagamihara (JP); Takafumi Kondou, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 1473 days.

(21) Appl. No.: 10/580,228

(22) PCT Filed: Nov. 18, 2004

(86) PCT No.: PCT/JP2004/017539
§ 371 (c)(1),
(2), (4) Date: May 22, 2006

(87) PCT Pub. No.: WO2005/052389
PCT Pub. Date: Jun. 9, 2005

(65) Prior Publication Data
US 2007/0104554 A1    May 10, 2007

(30) Foreign Application Priority Data
Nov. 28, 2003    (JP) .................................. 2003-399902

(51) Int. Cl.
*F16B 13/06*    (2006.01)
(52) U.S. Cl. ............................................. 411/58; 411/55
(58) Field of Classification Search ................. 411/80.5, 411/80.2, 508–511, 519, 187, 378, 402, 427, 411/437, 301, 57.1, 55, 58, 69; 403/408
See application file for complete search history.

(56) References Cited

U.S. PATENT DOCUMENTS

| | | | | |
|---|---|---|---|---|
| 1,944,513 A | * | 1/1934 | Johnson | 411/80.2 |
| 1,996,128 A | * | 4/1935 | Thomson | 411/27 |
| 2,076,041 A | * | 4/1937 | Payne | 411/410 |
| 2,348,589 A | * | 5/1944 | Auten | 411/15 |
| 2,393,606 A | * | 1/1946 | Brush | 411/80.1 |
| 2,400,142 A | * | 5/1946 | Tinnerman | 411/61 |
| 2,406,157 A | * | 8/1946 | Nelson | 411/15 |
| 2,448,351 A | * | 8/1948 | Brush | 411/80.5 |
| 2,632,355 A | * | 3/1953 | Becker | 411/427 |

(Continued)

FOREIGN PATENT DOCUMENTS

JP    51-163366    12/1976

(Continued)

OTHER PUBLICATIONS

U.S. Appl. No. 11/687,977, filed Mar. 19, 2007, Ishino, et al.

*Primary Examiner* — Flemming Saether
(74) *Attorney, Agent, or Firm* — Oblon, Spivak, McClelland, Maier & Neustadt, L.L.P.

(57) ABSTRACT

A fastening structure in which a first member and a second member are mutually connected, the second member is formed with a hole, the first member is formed with a tubular projecting portion, the hole is inserted into the tubular projecting portion, a fastening member including a threaded portion having an outer diameter larger than a minimum inside diameter of the tubular projecting portion and smaller than a hole diameter of the second member is screwed into the tubular projecting portion in the axis line direction, and by this screwing of the fastening member into the tubular projecting portion, the tubular projecting portion is expanded to expand radially and outwardly, and then an outer circumference surface of the tubular projecting portion is pressed onto the peripheral wall of the hole of the second member.

11 Claims, 7 Drawing Sheets

U.S. PATENT DOCUMENTS

| | | | | |
|---|---|---|---|---|
| 2,763,314 | A * | 9/1956 | Gill | 411/34 |
| 3,016,941 | A * | 1/1962 | Coldren | 411/134 |
| 3,358,551 | A * | 12/1967 | Seckerson | 411/15 |
| 3,385,157 | A * | 5/1968 | Rapata | 411/41 |
| 3,412,593 | A * | 11/1968 | Price | 72/335 |
| 3,842,710 | A * | 10/1974 | Poupitch | 411/504 |
| 4,263,833 | A * | 4/1981 | Loudin et al. | 411/41 |
| 4,367,995 | A * | 1/1983 | Mizusawa et al. | 411/80.2 |
| 4,448,565 | A * | 5/1984 | Peterson | 403/408.1 |
| 4,761,105 | A * | 8/1988 | Gardner | 411/80.2 |
| 4,878,791 | A * | 11/1989 | Kurihara et al. | 411/55 |
| 4,924,533 | A * | 5/1990 | Stairs, Jr. | 4/252.1 |
| 5,735,021 | A * | 4/1998 | Briggs | 16/369 |
| 2003/0185645 | A1 * | 10/2003 | Leistner | 411/188 |

FOREIGN PATENT DOCUMENTS

| | | |
|---|---|---|
| JP | 56-156512 | 12/1981 |
| JP | 62-83767 | 5/1987 |
| JP | 63-72310 | 5/1988 |
| JP | 4-25009 | 2/1992 |
| JP | 5-47517 | 6/1993 |
| JP | 7-18016 | 3/1995 |
| JP | 10-299735 | 11/1998 |
| JP | 10-306813 | 11/1998 |
| JP | 10-306814 | 11/1998 |
| JP | 2001-214911 | 8/2001 |
| JP | 2002-81425 | 3/2002 |
| JP | 2003-222109 | 8/2003 |
| JP | 2004-286072 | 10/2004 |

\* cited by examiner

FASTENING STRUCTURE, FASTENING METHOD AND FASTENING MEMBER

TECHNICAL FIELD

The present invention relates to a fastening structure which is formed by fastening a first member and a second member without generating mutual misalignment, a fastening method, a fastening member used for the fastening, and an image forming apparatus such as a copy machine using the above.

BACKGROUND ART

Structures such as copying machines, faxes, and printers are constructed such that a plurality of members are assembled, and then these members are mutually fastened by means of fastening such as welding, screw fastening, riveting, etc.

Since welding is carried out by melting members, the welded portion shows high strength. However, the welding requires large scale equipment, so it is disadvantageous of increasing cost. It also has a problem of deterioration of accuracy by thermal deformation. Consequently, sometimes screw fastening and rivet fastening can be used instead of using the welding.

Generally, when two members are mutually fastened by using a screw or rivet, a hole diameter in which the screw or rivet is inserted is adopted to be larger than the outer diameter of the inserted portion of the screw or the rivet; therefore, ample room is assured between the inserted portion and the hole when the screw or rivet is inserted. This is because the cost increase by the increase in diameter accuracy is curved by adopting the rivet or screw to be easily inserted.

However, in the screw fastening or rivet fastening, if ample room is maintained to the hole diameter, a space corresponding to the ample room is left after fastening. Accordingly, there was a problem that the connected portion is misaligned when large load is applied to the connected portion.

In order to solve the above problem the applicant has proposed a new fastening method described in Japanese Patent Laid-Opens H-10-299735, H10-306813, and H10-306814.

More particularly, the applicant has provided a blind rivet. In such a blind rivet, the mandrel of the blind rivet and the inside of the body to accept the rivet are respectively formed with a bump, and the bump of the mandrel is radially expanded so as to increase the outer diameter toward the bump of the body in the fastening process, so that the space between the mandrel and the inside of the body, which has been generated after fastening, is eliminated, and both members to be mutually connected by the blind rivet can be fastened without generating change in the relative positions over time.

However, the above blind rivet has a particular shape, so that it was disadvantageous in that the manufacturing cost is high.

DISCLOSURE OF INVENTION

It is therefore, an object of the present invention to provide a fastening method and a fastening structure, which curve the cost by using an inexpensive screw without using a particular fastening tool or a tool, and can conduct fastening without generating the change in a relative position between both members over time by eliminating a space which has been generated after fastening.

To accomplish the above objects of the present invention, according to one aspect of the present invention, there is provided a fastening structure in which a first member and a second member are mutually connected by a fastening member including a threaded portion, wherein the first member is formed with a tubular projecting portion which raises from one surface of the first member toward the second member and inwardly defines a hollow portion, the second member is formed with a hole in which the tubular projecting portion is inserted, the threaded portion of the fastening member includes an outer diameter larger than a minimum inside diameter of the hollow portion of the tubular projecting portion and smaller than a hole diameter of the second member, the threaded portion is screwed into the hollow portion of the tubular projecting portion inserted into the hole of the second member, the tubular projecting portion is formed with a radially expanded portion by expanding the tubular projecting portion radially and outwardly by screwing the threaded portion, and the first member and the second member are mutually fastened in a state where an outer circumference surface of the radially expanded portion abuts on a peripheral wall of the hole of the second member.

According to the fastening structure of the present invention, the hollow portion defined by the tubular projecting portion is a hollow portion whose both ends are open, penetrating the first member in its through-thickness direction.

According to the fastening structure of the present invention, at least one slit is formed from a leading end of the tubular projecting portion toward a base end thereof.

According to the fastening structure of the present invention, the slit extends from the base end of the tubular projecting portion to the one surface of the first member.

According to the fastening structure of the present invention, the radially expanded portion of the first member is pressed onto the peripheral wall of the hole of the second member without remaining a space between the radially expanded portion and the peripheral wall of the hole of the second member.

According to the fastening structure of the present invention, a base end portion of the tubular projecting portion of the first member is formed with a recess portion for controlling increase of torque required for screwing the fastening member.

According to the fastening structure of the present invention, the recess portion is defined by a radially increased portion of an inside diameter of the tubular projecting portion.

According to the fastening structure of the present invention, the radially increased portion includes a uniform bore diameter in an axis line direction of the tubular projecting portion.

According to the fastening structure of the present invention, a leading end of the tubular projecting portion is located in the hole of the second member and does not project from an other surface of the second member located in an opposite side of one surface of the second member facing to the one surface of the first member.

According to the fastening structure of the present invention, a leading end of the tubular projecting portion projects to an outward of the second member from an other surface of the second member located in an opposite side of one surface of the second member facing to the one surface of the first member, and an outer diameter in the projecting portion is larger than a bore diameter of the hole of the second member.

According to the fastening structure according of the present invention, the fastening member includes a flange portion at one end of the threaded portion, the threaded portion is screwed into the tubular projecting portion from a leading end of the tubular projecting portion such that the flange portion is located in an other surface side of the second member located in an opposite side of one surface of the second member facing to the one surface of the first member, and the second member is whereby sandwiched between the flange portion of the fastening member and the one surface of the first member.

According to the fastening structure of the present invention, the leading end of the tubular projecting portion projects to an outward of the second member from the other surface of the second member, an outer diameter in the projecting portion is larger than a bore diameter of the hole of the second member, and the projecting portion is sandwiched between the flange portion and the other surface of the second member.

According to the fastening structure of the present invention, the leading end of the tubular projecting portion projects to an outward of the second member from the other surface of the second member, an outer diameter in the projecting portion is larger than a bore diameter of the hole of the second member, and the flange portion is formed with a concave portion for accepting the projecting portion of the tubular projecting portion.

According to the fastening structure of the present invention, a closed space is formed by the concave portion of the flange portion and the other surface of the second member on which the flange portion abuts.

According to another aspect of the present invention, there is provided a fastening member used for the fastening structure of the present invention, wherein the threaded portion is formed by at least two kinds of thread shapes.

According to the fastening member of the present invention, a portion including one of the thread shapes mainly has a function for tapping the tubular projecting portion, and a portion including the other of the thread shapes mainly has a function for deforming the tubular projecting portion radially and outwardly.

According to the fastening member of the present invention, one of the thread shapes is an incomplete thread shape.

According to the fastening member of the present invention, the fastening member includes a flange portion at one end of the threaded portion, and an outer diameter of screw in a portion adjacent to the flange portion of the threaded portion is larger than an outer diameter of screw in a portion remote from the flange portion.

According to the fastening member of the present invention, a pitch in a portion adjacent to the flange portion of the threaded portion and a pitch in a portion remote from the flange portion are provided with mutual phase lag.

According to a further aspect of the present invention, there is provided a fastening method for mutually fastening a first member and a second member, comprising the steps of: forming a hole to the second member; forming a tubular projecting portion to the first member; inserting the tubular projecting portion into the hole; screwing a fastening member having a threaded portion larger than a minimum inside diameter of the tubular projecting portion and smaller than a hole diameter of the second member into the tubular projecting portion in the inserted state in an axis line direction of the tubular projecting portion; and pressing an outer circumference surface of the tubular projecting portion onto a peripheral wall of the hole of the second member by radially expanding the tubular projecting portion to expand radially and outwardly by screwing the fastening member into the tubular projecting portion.

According to the fastening method of the present invention, the tubular projecting portion is formed by a burring processing.

According to yet another aspect of the present invention, there is provided an image forming apparatus comprising the fastening structure according to the present invention to a fastening part.

According to still another aspect of the present invention, there is provided an image forming apparatus comprising the fastening member according to the present invention to a fastening part.

In the fastening structure of the present invention, without using particular equipment, the tubular projecting portion formed onto the first member is formed with the radially expanded portion in which the outer diameter of the tubular projecting portion increases by screwing the fastening member having the threaded portion into the tubular projecting portion, and the first member and the second member are mutually connected in the state where this radially expanded portion abuts on the peripheral wall of the hole of the second member.

Therefore, according to the fastening structure of the present invention, in the connected state of the first and second members, since the radially expanded portion nearly evenly abuts on the peripheral wall of the hole formed onto the second member in the peripheral direction, it is possible to obtain a structure having a connected portion showing high rigidity at a low price without generating conventional misalignment by external force and loosing after the first and second members have been fastened.

According to the fastening structure of the present invention, the fastening member can be screwed into the tubular projecting portion from any one of the base portion side or the leading end side of the tubular projecting portion according to need by penetrating the hollow portion defined by the tubular projecting portion in the through-thickness direction of the first member.

According to the fastening structure of the present invention, the tubular projecting portion is formed with the slit, and amount of the radially expanded portion of the tubular projecting portion is increased by this slit, so that the tubular projecting portion can be more absolutely abutted on the peripheral wall of the hole of the first member by the radially expanded portion. Therefore, the space between the tubular projecting portion and the peripheral wall of the hole of the first member can be eliminated, so that it is certainly possible to prevent the misalignment between both members.

According to the fastening structure of the present invention, since the slit provided in the tubular projecting portion extends to the one surface of the first member in which the tubular projecting portion is disposed, even if the forming position of the hole of the second member and the forming position of the tubular projecting portion of the first member are slightly misaligned, by the fastening of the fastening member, the tubular projecting portion is allowed the overall deformation to be fit into the hole by the slit. Therefore, a tolerance of the forming position of the tubular projecting portion can be set relatively large, and processing dimensional accuracy to be required can be reduced.

According to the fastening structure of the present invention, since the radially expanded portion of the first member is pressed onto the peripheral wall of the hole of the second member without remaining the space between the radially expanded portion of the first member and the peripheral wall of the hole of the second member, the space between the tubular projecting portion and the peripheral wall of the hole for fastening dose not generate. Therefore, it is possible to obtain the fastening structure having high connecting rigidity and excellent reliability.

According to the fastening structure of the present invention, since the base end portion of the tubular projecting portion is formed with the recess portion for controlling increase of torque required for screwing the fastening member, the increase of torque by excess-fastening of screw can be controlled. Therefore, it is possible to reduce use of a particular tool and burden of workers, so that working property in the connecting operation can be improved.

According to the fastening structure of the present invention, the recess portion can be formed relatively easy by defining the recess portion with the radially increased portion of the inside diameter of the tubular projecting portion.

According to the fastening structure of the present invention, the bore diameter of the radially increased portion is uniformly made in the axis line direction of the tubular projecting portion, so that the decrease in the mechanical strength in the base portion of the tubular projecting portion can be prevented compared with the case when the recess portion is formed by a taper hole gradually decreasing the bore diameter toward the leading end of the tubular projecting portion.

According to the fastening structure of the present invention, since the leading end of the tubular projecting portion does not project from the other surface of the second member, it is possible to prevent the deterioration in the appearance by the projection of the leading end of the tubular projecting portion from the other surface of the second member.

According to the fastening structure of the present invention, the leading end of the tubular projecting portion projects from the other surface of the second member, and this projecting portion sandwiches the edge portion of the hole of the second member in corporation with the first member, so that the mechanical strength with respect to the separation force acting in the axis line direction of the tubular projecting portion between the connected members of both first and second members is further enhanced.

According to the fastening structure of the present invention, the second member is sandwiched between the flange portion of the fastening member and the one surface of the first member, so that the mechanical strength with respect to the separation force similar to the above separation force acting in the direction for separating the connected members of the first and second members is further enhanced.

According to the fastening structure of the present invention, since the projecting portion is sandwiched between the flange portion and the other surface of the second member, in addition to enhancing the mechanical strength with respect to the above separation force, mechanical strength with respect to the sharing force acting on both connected members in the direction of the diameter of the tubular projecting portion can be enhanced.

According to the fastening structure of the present invention, since the projecting portion of the tubular projecting portion projecting from the other surface of the second member is accepted in the concave portion of the flange portion, the fastening member can be appropriately screwed into the tubular projecting portion so as to form an appropriate radially expanded portion onto the tubular projecting portion without requiring high dimensional accuracy for the processing of the tubular projecting portion. The projecting portion is also housed in the recess portion, so that the mechanical strength with respect to the separation force and the sharing force similar to the above can be enhanced without causing the deterioration in the appearance by the exposure of the projecting portion.

According to the fastening structure of the present invention, since the projecting portion of the tubular projecting portion is housed in the closed space defined by the concave portion, various deteriorations by exposing the projecting portion to the outside air are controlled. Therefore, the durability of the connected portion can be improved.

According to the fastening member of the present invention, by changing the shape of the thread of the fastening member, amount of the radially expanded portion of the tubular projecting portion disposed in the first member can be increased and decreased in accordance with this thread shape, so that the space between the radially expanded portion and the peripheral wall of the hole can be eliminated by pushing the radially expanded portion absolutely onto the peripheral wall of the hole.

According to the fastening member of the present invention, by using respective thread portions having different screw thread shapes mutually, the tapping to the tubular projecting portion and the radial and outward deformation of the tubular projecting portion can be effectively performed, and the radially expanded portion formed onto the tubular projecting portion can be effectively pushed onto the peripheral wall of the hole.

According to the fastening member of the present invention, one of the threads can be formed with the incomplete thread, and this incomplete thread can be formed by eliminating the outer circumference portion of the complete thread, for example, by grinding processing.

According to the fastening member of the present invention, the outer diameter of screw in the portion adjacent to the flange portion of the threaded portion is adopted to be larger than the outer diameter of screw in the portion remote from the flange portion more than the adjacent portion, so that, at first, the radially expanded portion is formed by screwing the fastening member into the tubular projecting portion, and then the fastening member can be absolutely screwed by the tapping to the radially expanded portion.

According to the fastening member of the present invention, since the mutual phase lag is provided for the pitches in the portion adjacent to the flange portion of the threaded portion and the pitches in the portion remote from the flange portion more than the adjacent portion, amount of the radially expanded portion of the tubular projecting portion disposed in the first member can be increased and decreased in accordance with this phase lag of the pitches. Therefore, the space between the radially expanded portion and the peripheral wall of the hole can be eliminated by definitely pressing the radially expanded portion onto the peripheral wall of the hole.

According to the fastening method of the present invention, without using particular equipment, by screwing the fastening member having the threaded portion into the tubular projecting portion formed onto the first member, the outer circumference surface of the tubular projecting portion can be pressed onto the peripheral wall of the hole of the second member by radially expanding the outer diameter of the tubular projecting portion to expand radially and outwardly, so that the fastening structure according to the present invention can be formed relatively easy at a low price.

According to the fastening method of the present invention, the tubular projecting portion can be formed relatively easy by forming the tubular projecting portion with burring processing.

According to the image forming apparatus of the present invention, since the fastening part is composed of the fastening structure according to the present invention, the mechanical strength is enhanced in the fastening part and the durability can be improved without generating the misalignment by the conventional external force and loosing in the fastening part.

According to the image forming apparatus of the present invention, the fastening member according to the present invention is applied to the fastening part, and since the fastening part is composed of the fastening structure according to the present invention, the mechanical strength is enhanced in the fastening part and the durability can be improved without generating the misalignment by the conventional external force and loosing in the fastening part.

BEST MODE FOR CARRYING OUT THE INVENTION

The features of the present invention will be further apparent by the following description in accordance with the embodiments illustrated by FIGs.

First Embodiment

Figure 1:
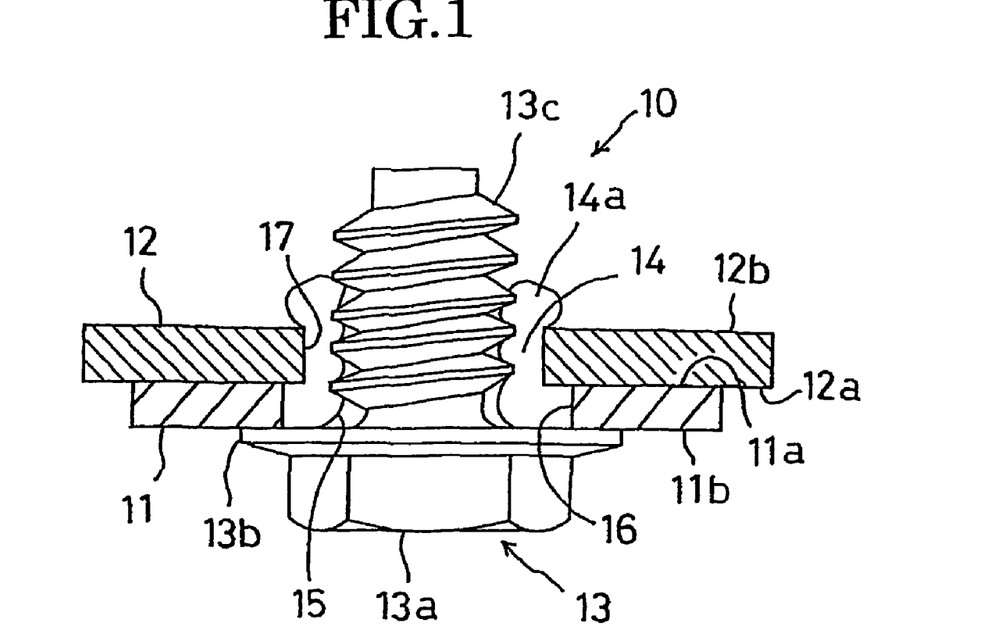
FIG. 1 is a longitudinal sectional view illustrating a fastening structure according to the present invention.

A fastening structure 10 according to the present invention is formed by connecting a first platy member 11 and a second platy member 12 with a fastening member 13 including a screw member as illustrated in FIG. 1.

Figure 2:
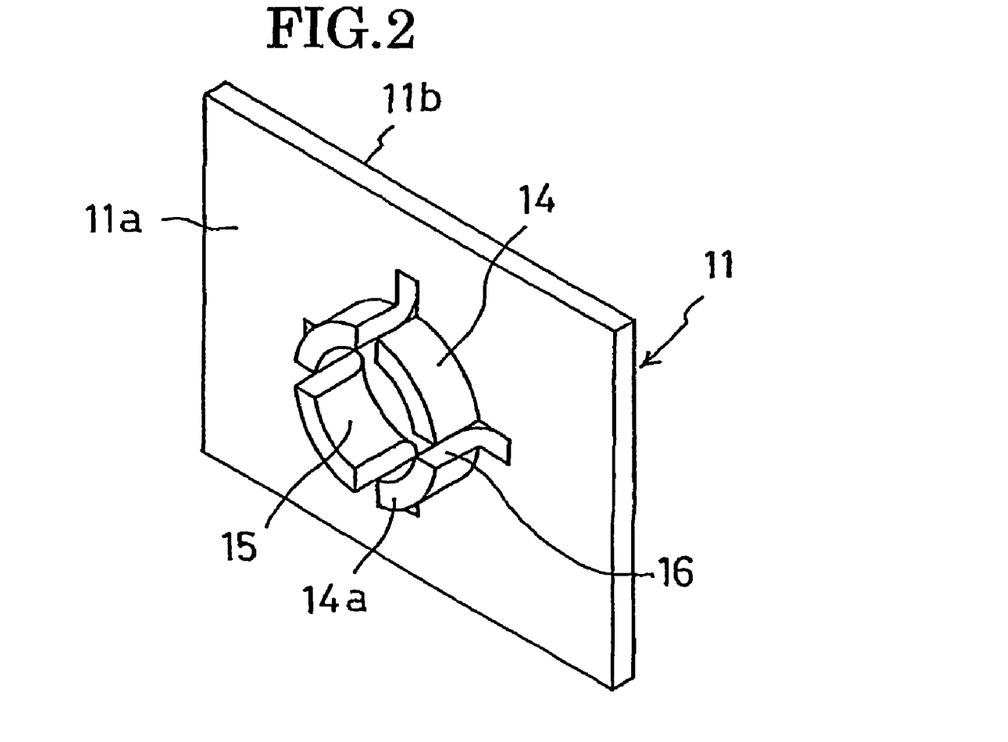
FIG. 2 is a perspective view illustrating a first member which is one of the structural elements of a fastening member according to the present invention.

The first member 11 comprises a chrome-free steel plate having 2 mm in thickness, for example. As illustrated in FIG. 2, the first platy member 11 is formed with a tubular projecting portion 14 rising from one surface 11a of the first member 11 by a burring process, for example. The tubular projecting portion 14 has, for example, 5.25 mm uniform outer diameter in its longitudinal direction. The tubular projecting portion 14 inwardly defines a column-shaped hollow portion 15. The hollow portion 15 conforms to an opening, which penetrates the first platy member 11 in the through-thickness direction, and penetrates the first platy member 11. The tubular projecting portion 14 is formed so as to rise from the edge portion of the opening of the one surface 11a of the first platy member 11.

The tubular projecting portion 14 is formed with a plurality of slits 16 stretching parallel to the axis line direction of the tubular projecting portion in the examples shown by FIGs. One end of each slit 16 reaches to a leading end portion 14a of the tubular projecting portion 14, and opens up to the leading end surface of the tubular projecting portion. In addition, the other end of each slit 16 reaches to the flat one surface 11a of the first platy member 11 from the base portion of the tubular projecting portion 14. As clearly shown in FIGS. 1, 3, part of the slit 16 extending to the one surface 11a also opens up to the other surface 11b of the first platy member 11 by penetrating the first platy member 11 in its through-thickness direction.

Figure 3:
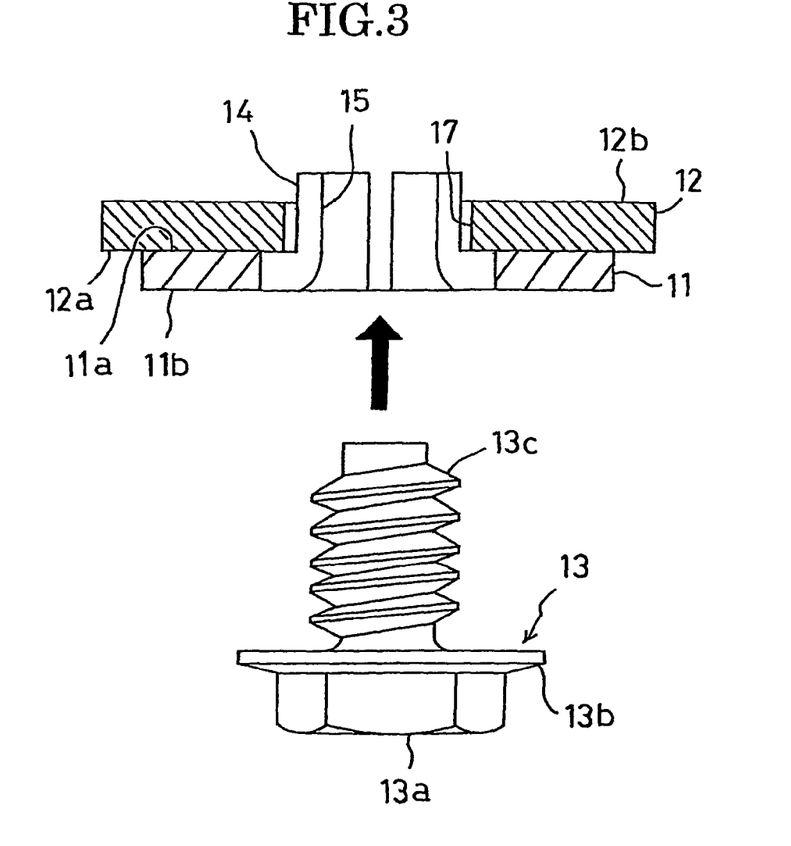
FIG. 3 is a longitudinal sectional view illustrating a combination between the first member and a second member according to the present invention.

The second platy member 12 comprises a steel plate having 2 mm in thickness, for example. The second platy member 12 is formed with a hole 17 penetrating the platy member in the through-thickness direction as shown in FIG. 3. The hole 17 has, for example, the bore diameter of 5.4 mm which is enough for accepting the tubular projecting portion 14 of the first platy member 11.

The tubular projecting portion 14 of the first platy member 11 is inserted into the hole 17 of the second platy member 12 from the side of one surface 12a of the second platy member 12. By inserting the tubular projecting portion 14 into the hole 17, one surface 11a in which the tubular projecting portion 14 of the first platy member 11 rises comes into contact with the one surface 12a of the second platy member 12. In the abutting state of both platy members 11, 12, the leading end portion 14a of the tubular projecting portion 14 has an enough height for projecting upward over the other surface 12b of the second platy member 12. Moreover, in the abutting state of both platy members 11, 12, a substantially even space is maintained in the peripheral direction of the hollow portion 15 between the peripheral wall of the hole 17 and the outer circumference surface of the tubular projecting portion 14 as illustrated in FIG. 3.

Even if a plurality of pairs of the holes 17 and the tubular projecting portions 14 are provided, despite variation of dimensional accuracy within respective processing errors, the space between the peripheral wall of the hole 17 and the outer circumference surface of the tubular projecting portion 14 can be appropriately set within the range in which the corresponding hole 17 and the tubular projecting portion 14 can be matched and the tubular projecting portion 14 can be pressed and fitted into the hole 17 of the tubular projecting portion 14 by screwing with the after-mentioned fastening member 13.

In the abutting state between the one surface 11a of the first platy member 11 and the one surface 12a of the second platy member 12, as shown in FIG. 3, the screwing member 13 is screwed into the tubular projecting portion 14 from the side of the other surface 11b of the first platy member 11 till a flange portion 13b abuts on the other surface 11b of the first platy member 11.

A screw member of the fastening member is, for example, M4 tapping screw of general purpose. The screw member comprises a head portion 13a, the flange portion 13b which is integrally formed with the head portion and has an outer diameter larger than the head portion 13a, and a threaded portion 13c which has an outer diameter i.e. a thread diameter larger than the least bore diameter of the hollow portion 15 formed onto the first platy member 11 and smaller than the hole diameter of the hole 17 of the second platy member 12. The tapping screw i.e. the threaded portion 13c of the fastening member 13 shown in FIG. 3 has a uniform pitch and thread diameter in the axis line direction.

As described above, since the outer diameter of the threaded portion 13c of the fastening member 13 is larger than the least bore diameter of the hollow portion 15 of the tubular projecting portion 14, the tubular projecting portion 14 is expanded radially and outwardly by screwing the screwing member 13c into the tubular projecting portion 14. That is, the outer circumference wall of the tubular projecting portion 14 is pushed onto the peripheral wall of the hole 17 by the radially expanded tubular projecting portion 14. Moreover, the leading end portion 14a of the tubular projecting portion 14 projecting from the other surface 12b of the second platy member 12 i.e. the outer surface of the projecting portion 14 expands, and then plastically deforms radially and outwardly in whole such that the projecting portion covers the edge portion of the opening of the hole 17 of the other surface 12b of the second platy member 12. Therefore the outer diameter of the leading end portion 14a becomes larger than the bore diameter of the hole 17.

The slit 16 divides the tubular projecting portion 14 in its peripheral direction, so that the slit 16 facilitates the deformation of the tubular projecting portion 14 in the radial and outward direction by the fastening of the fastening member 13. Therefore, rotation torque required for screwing the fastening member 13 is reduced, and also the increased amount of the outer diameter by the deformation of the tubular projecting portion 14 i.e. amount of the radially expanded portion is increased.

By the above described deformation of the tubular projecting portion 14 with the screwing of the fastening member 13, the outer circumference wall of the tubular projecting portion is pushed nearly evenly in the peripheral direction without remaining space between the outer circumference wall of the tubular projecting portion 14 and the peripheral wall of the hole 17, and is firmly attached to the peripheral wall of the hole 17. Moreover, the projecting portion 14a of the tubular projecting portion 14 engages with the other surface 12b of the second platy member 12 in the edge portion of the opening of the hole 17 by the plastic deformation. The first platy member 11 and the second platy member 12 are firmly connected by the radially expanded portion of the tubular projecting portion pushed onto the peripheral wall of the hole 17 and the engaged portion by the projecting portion 14a. In this connected state, the second platy member 12 is sandwiched between the flange portion 13b of the fastening member 13 and the projecting portion 14a of the tubular projecting portion 14 disposed in the first platy member 11 by screwing the fastening member 13, so that the connected strength of both members 11, 12 is further enhanced.

Sheet metal JIS G 3141 can be used as the first platy member 11. In this case, tapping screw JIS B 1055 can be used as the fastening member 13. As a combination of the first platy member 11 and the fastening member 13, various materials of the first platy member 11 and the fastening member 13 can be used as long as the hardness of the fastening member 13 is larger than the hardness of the first platy member 11. Since the fastening member 13 having the hardness harder than the hardness of the first platy member 11 is used, the fastened both members 11, 12 can be easily disconnected, and also the fastening member 13 can be reused.

Figure 4:
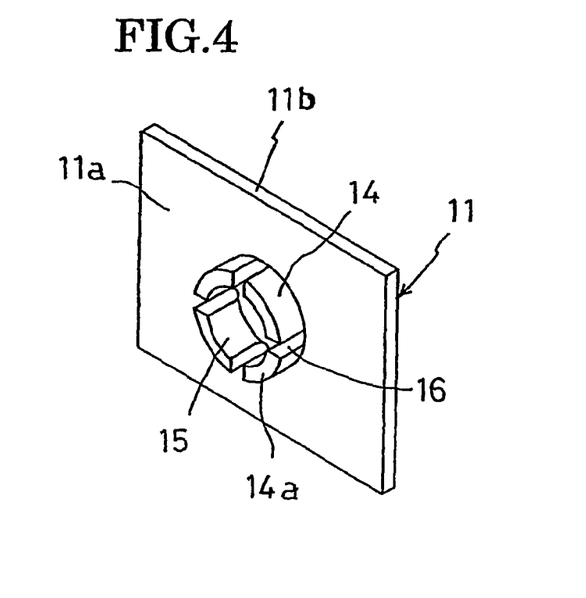
FIG. 4 is a perspective view showing a modification example of a first member of a fastening structure according to the present invention.

As shown in FIG. 4, the slit 16 disposed in the tubular projecting portion 14 can be ended at the base portion of the tubular projecting portion 14 without stretching the slit 16 to the one surface 11a. In this case, when the fastening member 13 similar to the above is screwed into the tubular projecting portion 14, amount of the radially expanded portion of the tubular projecting portion 14 is increased by the dividing function of the slit 16 similar to the example shown in FIG. 2, and the rotation torque required for screwing the fastening member 13 can be reduced.

However, as illustrated in FIG. 2, by extending the slit 16 disposed in the tubular projecting portion 14 onto the one surface 11a of the plane surface of the first platy member 11, the tubular projecting portion 14 is deformed in whole to fit into the hole 17 with the slit 16 by the fastening of the fastening member 13, even if the forming position of the hole 17 of the second member 12 and the forming position of the tubular projecting portion 14 of the first member 11 are slightly misaligned. Therefore, the allowable error of the forming position of the tubular projecting portion 14 can be relatively increased, and the required processing dimensional accuracy can be reduced by forming the slit 16 to extend onto the one surface 11a of the first platy member 11.

Figure 5:
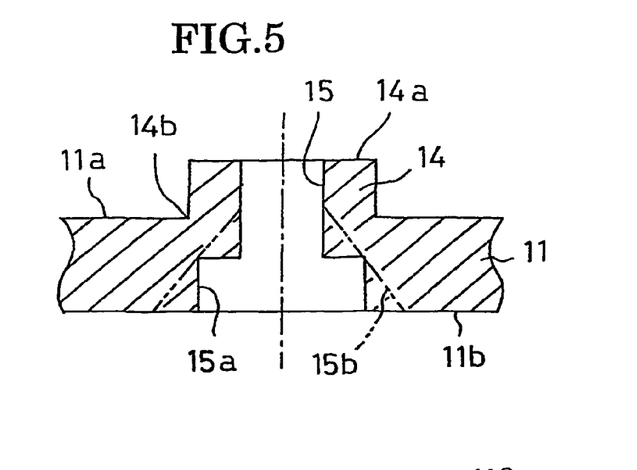
FIG. 5 is a cross section view of the first member showing a recess portion formed onto a tubular projecting portion.

In order to reduce the rotation torque required for screwing the fastening member 13, the base portion of the tubular projecting portion 14 is formed with a recess portion 15a as shown in FIG. 5. The recess portion 15a is formed with the hollow portion 15 of the other surface 11b of the first platy member 11, and comprises radially increased portion including a uniform bore diameter in the through-thickness direction of the first platy member 11.

The through-thickness portion excluding the tubular projecting portion 14 of the first platy member 11 provides strong rotational resistance to the fastening member when the fastening member 13 is screwed into the tubular projecting portion 14, but does not contribute to the formation of the radially expanded portion by the tubular projecting portion 14. Consequently, as illustrated, by forming the radially increased portion 15a of the hollow portion 15 on the one surface 11a of the first platy member 11, the rotational resistance affecting to the fastening member 13 can be reduced without having substantial influence on the formation of the radially expanded portion of the tubular projecting portion 14.

As illustrated by the dotted lines in FIG. 5, the recess portion can be formed by a taper hole 15b which gradually increases the bore diameter toward the other surface 11b of the first platy member 11. However, in this case, a fragile portion comprising a thin-walled portion is formed between the peripheral wall of the taper hole 15b and the rising edge 14b of the tubular projecting portion 14. Therefore, it is preferable for the recess portion to be constructed by the radially increased portion 15a having a uniform bore diameter shown by the solid line in FIG. 5 in order to reduce the rotational resistance without reducing the mechanical strength of the tubular projecting portion 14.

Second Embodiment

In the fastening structure 10 of the first embodiment shown in FIGS. 1 to 5, the example that the leading end portion 14a of the tubular projecting portion 14 projects from the other surface 12b of the second platy member 12 is shown. However, as illustrated by a fastening structure 110 in FIG. 6, the height of the tubular projecting portion 14 from the one surface 11a of the first platy member 11 on which the tubular projecting portion 14 is formed can be smaller than the through-thickness dimension of the second platy member 12 in order to avoid the outward projection of the leading end portion 14a of the tubular projecting portion 14 from the other surface 12b of the second platy member 12.

Figure 6:
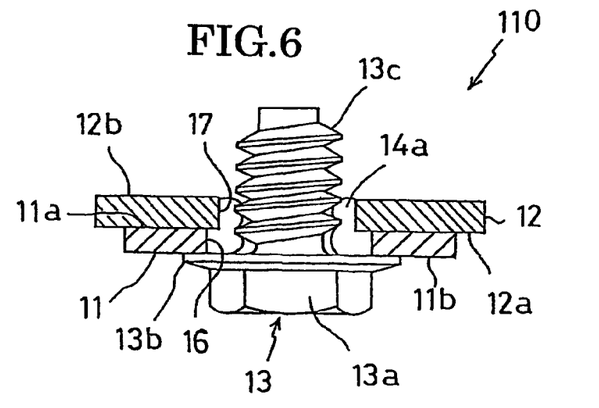
FIG. 6 is a view similar to FIG. 1, illustrating a second embodiment of a fastening structure according to the present invention.

According to the fastening structure 110, the outer circumference surface of the tubular projecting portion is pushed onto the peripheral surface of the hole 17 by screwing the fastening member 13 into the tubular projecting portion 14, and also the first platy member 11 is sandwiched between the second platy member 12 and the flange portion 13b of the fastening member 13, so that both platy members 11, 12 are fastened. In this fastened state, the leading end portion 14a of the tubular projecting portion 14 does not protrude from the hole 17 of the second platy member 12; therefore, the deterioration in the appearance by the protrusion of the leading end portion to the edge portion of the opening of the hole 17 of can be controlled, so that the deterioration in the appearance by the protrusion seen from the other surface 12b of the second platy member 12 can be controlled.

Third Embodiment

Figure 7:
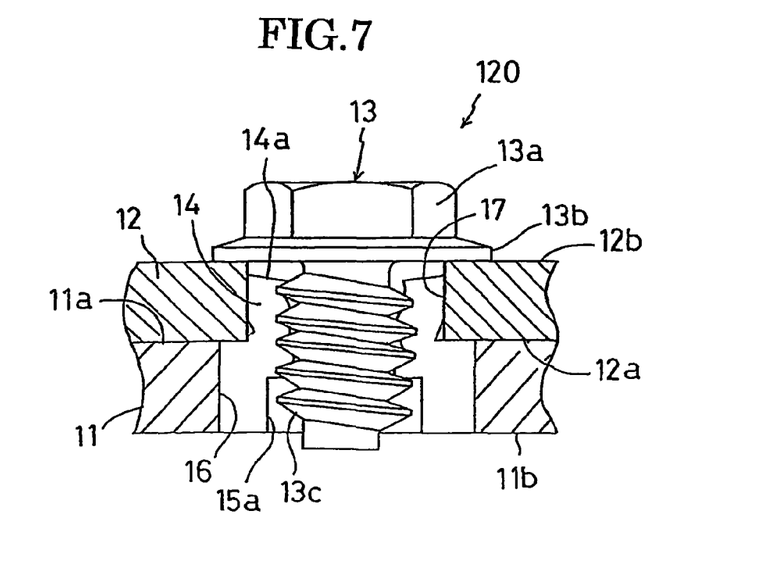
FIG. 7 is a longitudinal sectional view similar to FIG. 1, illustrating a third embodiment of a fastening structure according to the present invention.

As shown in a fastening structure 120 of FIG. 7, the fastening member 13 can be screwed into the tubular projecting portion 14 from the side of the second platy member 12 in which the hole 17 for accepting the tubular projecting portion 14 of the first platy member 11 is formed.

In the example of the fastening structure 120, similar to the example shown in FIG. 6, the height dimension of the tubular projecting portion 14 from the one surface 11a of the first platy member 11 is smaller than the through-thickness dimension of the second platy member 12. Moreover, the base portion of the tubular projecting portion 14 is formed with the recess portion 15a similar to the recess portion shown in FIG. 5 opening up to the other surface 11b of the first platy member 11. In the fastening structure 120, the one surface 11a of the first platy member 11 and the one surface 12a of the second platy member 12 are mutually abutted such that the tubular projecting portion 14 of the first platy member 11 is accepted in the hole 17 of the second platy member 12. In this abutting state, the threaded portion 13c of the fastening member 13 is screwed into the tubular projecting portion 14 from its leading end portion 14a.

The radially expanded portion similar to the above is formed to the tubular projecting portion 14 by screwing the fastening member 13, therefore, the outer circumference surface of the tubular projecting portion 14 is pushed onto the peripheral wall of the hole 17. In addition, the flange portion 13b of the fastening member 13, together with the one surface 11a of the first platy member 11, sandwiches the edge portion of the opening of the hole 17 of the second platy member 12 therebetween.

Therefore, according to the fastening structure 120, large rotation torque of the fastening member 13 is not required, and the appearance from the side of the second platy member 12 can be improved because the head portion 13a of the fastening member 13 is only positioned onto the other surface 12b of the second platy member 12.

Fourth Embodiment

Figure 8:
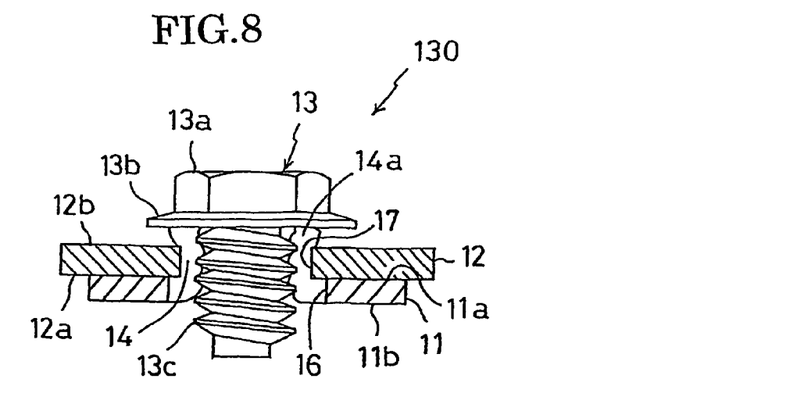
FIG. 8 is a longitudinal sectional view similar to FIG. 1, illustrating a fourth embodiment of a fastening structure according to the present invention.

A fastening structure 130 illustrated in FIG. 8 indicates an example for screwing the fastening member 13 into the tubular projecting portion 14 from the side of the second platy member 12 similar to the example shown in FIG. 7 by using the tubular projecting portion 14 in which the height dimension from the one surface 11a of the first platy member 11 is larger than the through-thickness dimension of the second platy member 12.

According to the fastening structure 130, the outer circumference surface of the tubular projecting portion 14 is pushed onto the peripheral wall of the hole 17 by screwing the fastening member 13 into the tubular projecting portion 14 from the leading end portion 14a. In addition, the projecting portion 14a expanding radially and outwardly from the edge portion of the opening of the hole 17 on the other surface 12b of the second platy member 12 is sandwiched between the other surface 12b and the flange portion 13b of the fastening member 13.

Therefore, the projecting portion 14a can be covered with the flange portion 13b of the fastening member 13, so that the appearance can be improved. Moreover, since the projecting portion 14a can be sandwiched between the flange portion 13b and the other surface 12b of the second platy member 12, the fastening strength between both members 11, 12 can be further improved.

Fifth Embodiment

Figure 9:
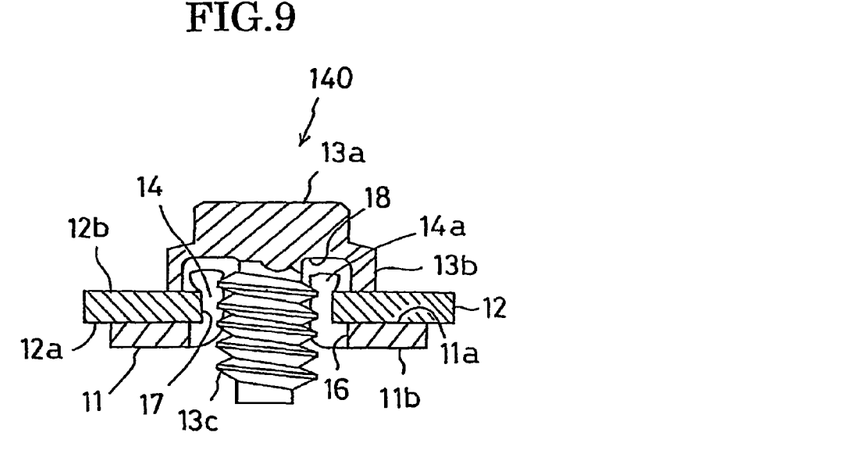
FIG. 9 is a longitudinal sectional view similar to FIG. 1, illustrating a fifth embodiment of a fastening member according to the present invention.

As shown in FIG. 9, the flange portion 13b of the fastening member 13 is formed with a concave portion 18 for accepting the projecting portion 14a. The concave portion 18 is circularly formed along the peripheral direction of the flange portion 13b, and opens up to the lower surface of the flange portion.

In a fastening structure 140 shown in FIG. 9, the circumferentia surrounding the concave portion 18 of the flange portion 13b is pressed onto the other surface 12b of the second platy member 12. The concave portion 18 herewith forms a circular closed space for accepting the projecting portion 14a together with the other surface 12b.

According to the fastening structure 140, despite slight variations in the height dimension of the tubular projecting portion 14 by the variations in the processing accuracy of the tubular projecting portion 14, the projecting portion 14a is accepted in the concave portion 18 of the flange portion 13b. Therefore, high dimension accuracy is not required for the processing of the tubular projecting portion 14, and the fastening member 13 can be appropriately screwed into the tubular projecting portion 14 such that an appropriate radially expanded portion is formed.

Since the projecting portion 14a is contained in the closed space, even if the other surface 12b of the second platy member 12 is exposed to outside air, for example, water entering from between the flange portion 13b of the fastening member 13 and the second platy member 12 can be blocked, and the deterioration in the projecting portion 14a of the tubular projecting portion 14 by this water can be controlled, so that the durability of the connected portion can be improved.

In the first to the fifth embodiments, a taping screw including complete threads having a uniform diameter and a uniform pitch is used as the fastening member 13. Instead of using this, a fastening member including incomplete threads can be used as shown in FIGS. 10, 11.

Figure 10:
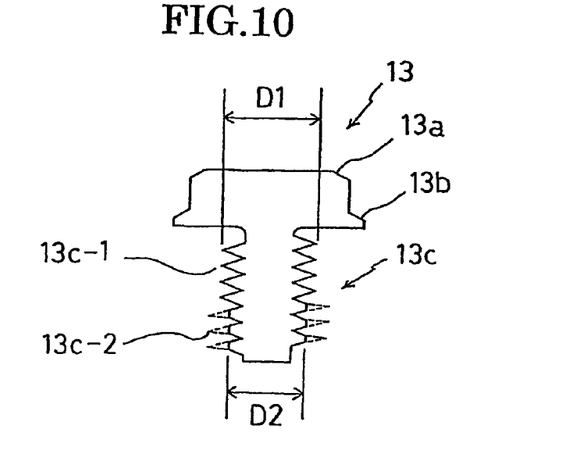
FIG. 10 is a schematic view illustrating another embodiment of a fastening member used for a fastening structure according to the present invention.
Figure 11:
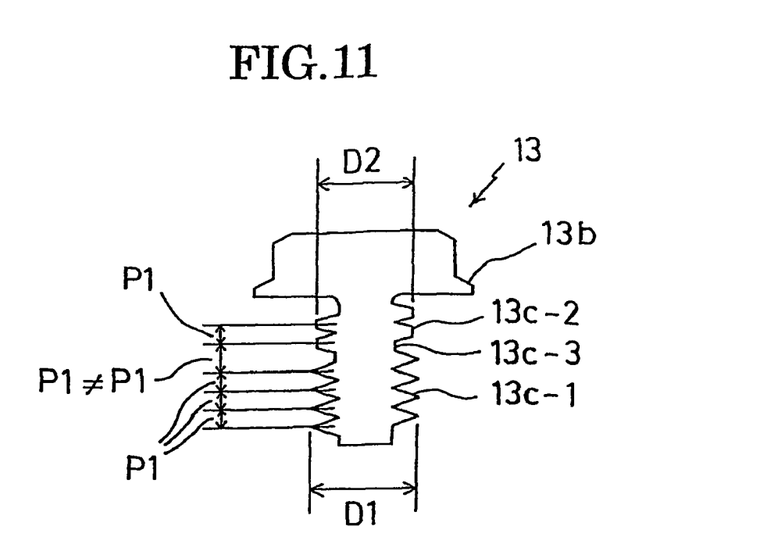
FIG. 11 is a schematic view showing another embodiment of a fastening member used for a fastening structure according to the present invention.

The fastening member 13 shown in FIG. 10 is formed with the threaded portion 13c having a uniform pitch; however, a threaded portion 13c-1 adjacent to the flange portion 13b is a complete thread having a thread diameter D1 in which the edge of the thread is not removed. On the other hand, a threaded portion 13c-2, which is formed following the threaded portion 13c-1 on the other side of the flange portion 13b of the threaded portion 13c-1, is an incomplete thread. Such an incomplete thread has a thread diameter D2 smaller than the thread diameter D1 of the threaded portion 13c-1. The thread diameter D2 is formed by grinding the edge of the thread shown by the dotted lines having a thread diameter larger than the thread diameter D1 of the threaded portion 13c-1 having a complete thread.

When the fastening member 13 is screwed into the tubular projecting portion 14, the threaded portion 13c-2 having the incomplete thread of the fastening member 13 engages with the tubular projecting portion 14, and then the threaded portion 13c-1 having the complete thread engages with the tubular projecting portion 14.

Therefore, as screwing the fastening member 13, the outer diameter of the tubular projecting portion 14 is mainly expanded by engaging with the incomplete threaded portion 13c-2, and then the tubular projecting portion 14 is threaded by engaging with the following complete threaded portion 13c-1. When the tubular projecting portion 14 is threaded by this complete threaded portion 13c-1, at the same time, the outer diameter of the tubular projecting portion 14 is further expanded.

Accordingly, by using the fastening member 13 shown in FIG. 10, the outer diameter of the tubular projecting portion 14 is further deformed. By the increase in amount of the radially expanded portion of the tubular projecting portion 14, the outer circumference surface of the tubular projecting portion 14 is definitely pressed onto the peripheral surface of the hole 17 by stronger suppress strength without remaining space. The fastening strength of both members 11, 12 is herewith enhanced.

In the fastening member 13 illustrated in FIG. 11, the leading end portion of the threaded portion 13c of the fastening member 13 is formed with the complete threaded portion 13c-1. The incomplete threaded portion 13c-2 similar to the above is formed between the complete threaded portion 13c-1 and the flange portion 13b. In addition, both threaded portions 13c-1, 13c-2 include the equal pitch dimension P1; however, the pitches of both threaded portions 13c-1, 13c-2 are provided with mutual phase lag by a pitch changing portion 13c-3 formed between both threaded portions 13c-1, 13c-2.

According to the fastening member 13 shown in FIG. 1, the tubular projecting portion 14 is mainly threaded by engaging with the complete threaded portion 13c-1. The core diameter portion of the female screw groove of the tubular projecting portion 14 formed by this tapping is largely deformed radially and outwardly by the thread diameter portion of the incomplete threaded portion 13c-2.

In the fastening member 13 in which the phase lag is provided for the pitch, after the tubular projecting portion 14 is threaded, the threaded portion is radially expanded. Therefore, alike the fastening member 13 shown in FIG. 10, the outer diameter of the tubular projecting portion 14 can be further deformed by screwing this fastening member 13, and by the increase in amount of the radially expanded portion of the tubular projecting portion 14, the outer circumference surface of the tubular projecting portion 14 can be definitely pressed onto the peripheral surface of the hole 17 by stronger suppress strength without remaining space. Accordingly, the fastening strength of both members 11, 12 can be further enhanced.

Figure 12:
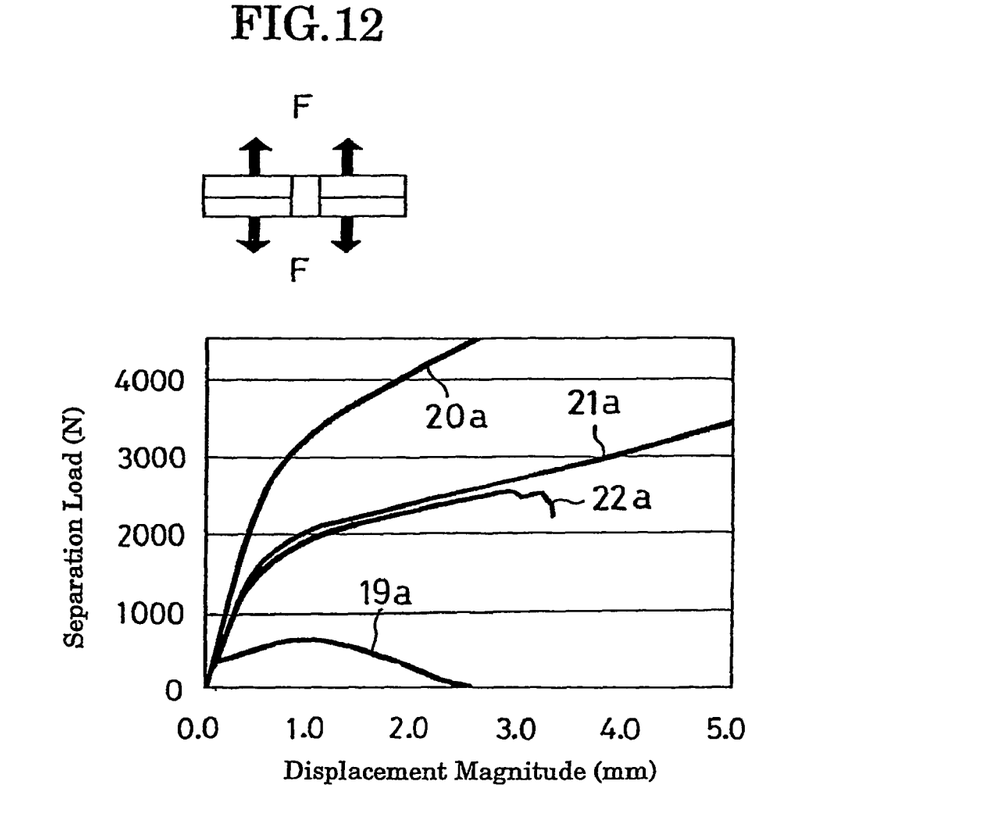
FIG. 12 is a graph showing comparison of peel strength between the fastening structure of the first embodiment according to the present invention and a conventional structure.
Figure 13:
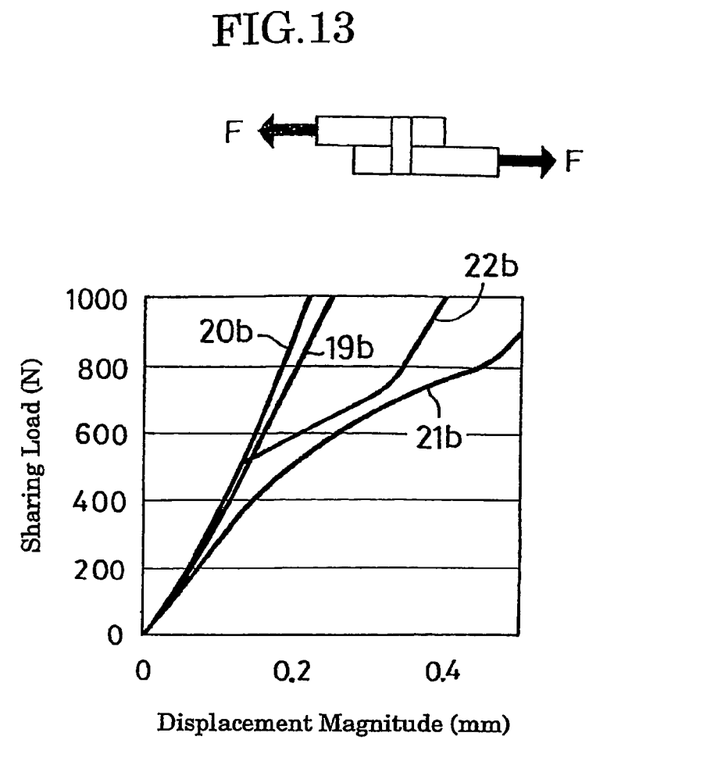
FIG. 13 is a graph showing comparison of shear strength between the fastening structure of the first embodiment according to the present invention and a conventional structure.
Figure 14:
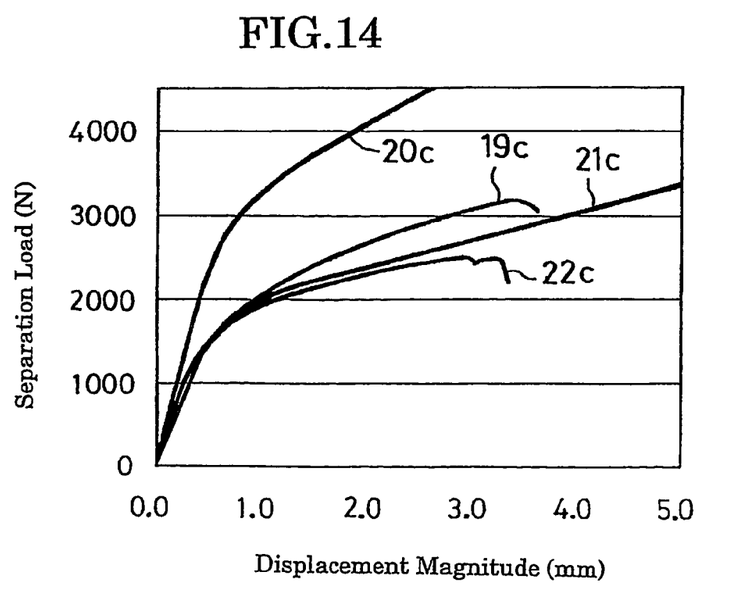
FIG. 14 is a graph similar to FIG. 12, illustrating comparison of peel strength between the fastening structure of the third embodiment according to the present invention and a conventional structure.

FIGS. 12 to 14 are graphs illustrating comparison of strength between the fastening structure according to the present invention and respective conventional fastening structures using welding, a rivet, and a tapping screw. Each vertical axis shows load (N) applied between mutually connected platy members, and each horizontal axis shows displacement magnitude (mm) between both platy members generated by the load. In addition, a chrome-free steel plate having 2 mm in thickness is used as all platy members.

In FIG. 12, as the fastening structure according to the present invention, the fastening structure 10 shown in FIG. 1 is used as a sample. The fastening structure 10 shows the example that the fastening member 13 having a uniform pitch and uniform thread diameter shown in FIG. 3 is screwed into the tubular projecting portion 14 from the base portion in the side of the other surface 11b of the first platy member 11 as described in the first embodiment.

The outer diameter of the tubular projecting portion 14 is 5.25 mm, the inside diameter of the hole 17 for accepting the tubular projecting portion 14 is 5.4 mm, and M4 tapping screw is used as the fastening member 13. As illustrated outside the graph of FIG. 12, separation force F acting at right angles to the joint surface of the mutually fastened both platy members is applied to both of the platy members as the load. The relationship between the separation load and the displacement of at this point is shown by a characteristic line 19a.

On the other hand, as conventional structures, spot welding, rivet fastening using a rivet having 4.8 mm in diameter, and direct fastening using M4 tapping screw are adopted as the samples. In the direct fastening of the tapping screw and the rivet, a hole having prepared hole diameter corresponding to each conventional standard is formed, and the rivet or the tapping screw are fastened thereto. The relationship between the separation load and the displacement in each of the spot welding, rivet fastening, and direct fastening by a tapping screw is shown by the characteristic lines 20a, 21a, and 22a, respectively.

FIG. 13 shows characteristic lines 19b to 22b similar to the lines shown in FIG. 12 when sharing force F acting parallel to the joint surface of the mutually connected both platy members by using the same sample shown in FIG. 12. The characteristic line 19b shown in the graph of FIG. 13 is the characteristic line illustrating the relationship between the sharing load and the displacement of the fastening structure 10 according to the present invention. The characteristic lines 20b, 21b, and 22b are the characteristic lines showing the relationship between the sharing load and the displacement in each of the spot welding, rivet fastening, and direct fastening by a tapping screw.

In FIG. 14, as the fastening structure according to the present invention, the fastening structure 120 shown in FIG. 7 is adopted as a sample. The fastening structure 120 illustrates the example that the fastening member 13 having a uniform pitch and a screw thread diameter shown in FIG. 3 is screwed into the tubular projecting portion 14 from the leading end portion 14a in the side of the other surface 12b of the second platy member 12, as described in the third embodiment. The graph of FIG. 14 illustrates the relationship between the separation load and the displacement magnitude at the time. The characteristic line 19c shows the relationship between the separation load and displacement magnitude in the fastening structure 120 according to the present invention. Each of the lines 20c, 21c, and 22c shows the relationship between the separation load and the displacement magnitude in the spot welding, rivet welding, and direct screwing by a tapping screw similar to the above, respectively.

As apparent from the comparison of the respective characteristic lines 19a to 22a shown in the graph of FIG. 12, in the fastening structure 10 illustrated in FIG. 1, for example, the displacement exceeding 1 mm generates between the mutually fastened platy members by the separation load less than 1000N. On the other hand, the displacement exceeding 1 mm generates by the separation load exceeding 2000N in each fastening device of the spot welding, rivet fastening, or direct fastening of a tapping screw. Therefore, there may be a case for the fastening structure 10 which does not bring out sufficient strength with respect to separation force.

However, as apparent from the comparison of each characteristic line 19b to 22b of the graph of FIG. 13, the fastening structure 10 according to the present invention shows strength substantially equal to the strength of the spot welding with respect to sharing force.

Therefore, it is preferable for a part requiring strength with respect to sharing force to adopt the fastening structure in which the fastening member 13 is screwed into the tubular projecting portion 14 from its base portion.

On the other hand, as apparent from the comparison of each characteristic lines 19c to 22c shown in the graph of FIG. 14, the fastening structure 120 shown in FIG. 7 only shows the displacement magnitude smaller than each fastening device of the rivet fastening or the direct fastening of a tapping screw regarding the separation load exceeding 2000N, for example. The fastening structure 120 accordingly shows high strength with respect to separation load compared to the rivet fastening or the direct fastening of a tapping screw.

Therefore, it is preferable for a part requiring strength with respect to separation load to adopt the fastening structure in which the fastening member 13 is screwed into the tubular projecting portion 14 from its leading end portion.

Figure 15:
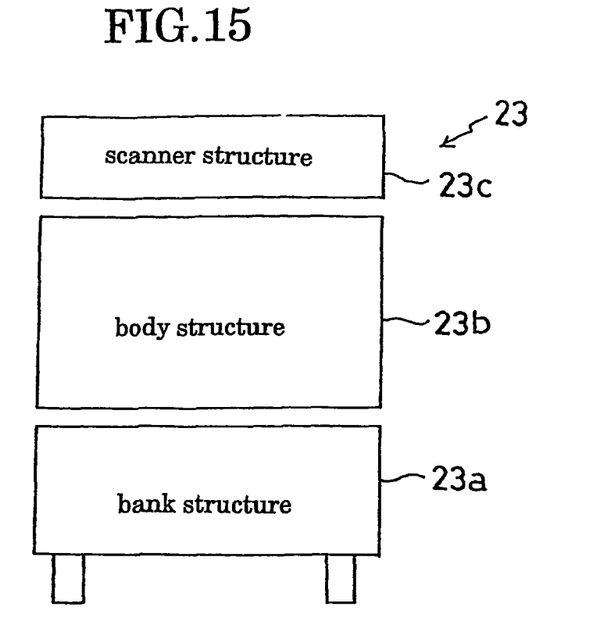
FIG. 15 is a schematic view showing a layout of structure illustrating each component part of a copying machine according to the present invention.

In FIG. 15, an example of an image forming apparatus is illustrated as a general copying machine 23. The copying machine 23 comprises a bank structure 23a disposed in the lowest portion, a copying body structure 23b disposed over the bank structure, and a scanner structure 23c which is disposed over the copying body structure 23b and reads an image of the copying body.

Figure 16:
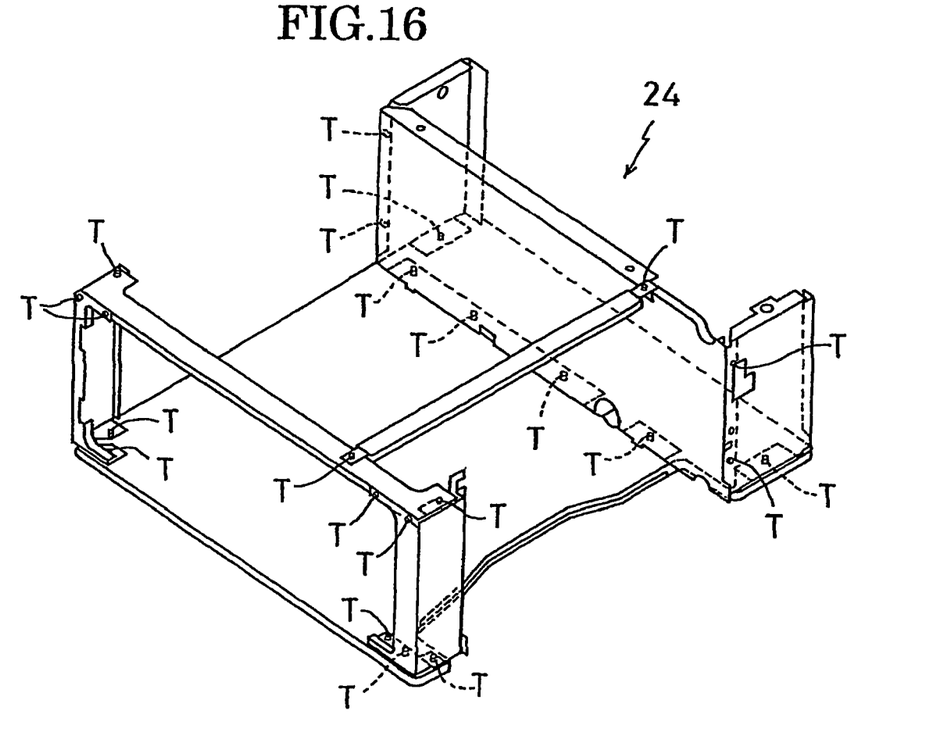
FIG. 16 is a perspective view showing an example in which a fastening structure according to the present invention is applied to each connected portion of a flame of a body structure and bank structure shown in FIG. 15.

FIG. 16 indicates an example that the fastening structures 10 to 140 according to the present invention are applied to each flame structure 24 of the bank structure 23a and the copying body structure 23b of such a copying machine 23. The fastening structures 10 to 140 according to the present invention can be applied for the fastening in each part shown by reference numeral T.

In the above, the example in which the tubular projecting portion 14 is formed with the slit 16 by penetrating in the through-thickness direction is shown. However, a concave groove which does not penetrate in the through-thickness direction of the tubular projecting portion 14 can be formed on the front surface or back surface of the tubular projecting portion 14 instead of the slit 16 of the tubular projecting portion 14. Moreover, these slit 16 and the concave groove are not always required. However, in order to reduce the torque required for fastening the fastening member 13 and to increase the expanded amount of the radially expanded portion, it is preferable for the above slit 16 or the concave groove to be formed onto the tubular projecting portion 14.

According to the present invention, as described above, the hole 17 is formed onto the second platy member 12, and the tubular projecting portion 14 is integrally formed onto the first platy member 11. Both members 11, 12 are combined to insert the tubular projecting portion 14 into the hole 17. In this combined state, the fastening member 13 having a threaded portion 13c larger than the minimum inside diameter of the tubular projecting portion 14 and smaller than the diameter of the hole 17 of the second platy member 12 is screwed into the tubular projecting portion 14 in the axis line direction of the tubular projecting portion 14. By screwing the fastening member 13 into the tubular projecting portion 14, the tubular projecting portion is radially expanded to expand radially and outwardly, and the outer circumference surface of the tubular projecting portion 14 is pressed onto the peripheral wall of the hole 17 of the second member 12. By this pressing, the outer circumference wall of the tubular projecting portion 14 is equally pushed in the circumferential direction without remaining space between the outer circumference wall of the tubular projecting portion 14 and the peripheral wall of the hole 17, and is firmly attached to the peripheral wall of the hole 17, and then both members 11, 12 are basically fastened by engaging between the outer circumference wall of the tubular projecting portion 14 and the peripheral wall of the hole 17.

Instead of forming the tubular projecting portion 14 onto the first platy member 11 by burring processing, for example, the first platy member 11 is formed by casting, and the tubular projecting portion 14 can be integrally formed with the first platy member 11 during the casting. Moreover, a platy member in which the hole 17 is formed onto the second platy member 12 in advance can be used.

The present disclosure relates to the subject matter contained in previous Japanese Patent Application No. 2003-399902, filed on Nov. 28, 2003, the content of which is herein expressly incorporated by reference in its entirety.

EFFECT OF THE INVENTION

Therefore, according to the present invention, basically, it is possible to provide a fastening method and a fastening structure, which curve the cost by using an inexpensive screw member without using a particular fastening tool or a tool, and can conduct fastening without generating the change in a relative position between the first member and the second member over time.

The invention claimed is:

1. A fastening structure in which a first member and a second member are mutually connected by a fastening member including a threaded portion, the fastening structure comprising:
a tubular projecting portion provided on the first member; and
at least one slit formed in the tubular projecting portion, wherein
the tubular projecting portion raises from one surface of the first member toward the second member and inwardly defines a hollow portion,
the second member is formed with a hole in which the tubular projecting portion is inserted,
the slit extends from a leading end of the tubular projecting portion to a base end thereof and which continues to the first member,
the tubular projecting portion having a constant wall thickness from the leading end to the base end,
the threaded portion of the fastening member includes an outer diameter larger than a minimum inside diameter of the hollow portion of the tubular projecting portion and smaller than a hole diameter of the second member, the threaded portion is screwed into the hollow portion of the tubular projecting portion inserted into the hole of the second member, and the tubular projecting portion is formed with a radially expanded portion by expanding the tubular projecting portion radially and outwardly by screwing the threaded portion, the radially expanded portion being formed by a leading end of the tubular projecting portion projecting from the hole of the second member being deformed and the first member and the second member are mutually fastened in a state where an outer circumference surface of the radially expanded portion abuts on a peripheral wall of the hole of the second member to cover an opening edge portion of the hole of the second member, as the threaded portion is screwed into the hollow portion of the tubular projecting portion, wherein the hollow portion defined by the tubular projecting portion is a hollow portion whose both ends are open, penetrating the first member in its through-thickness direction.

2. The fastening structure according to claim 1, wherein the radially expanded portion of the first member is pressed onto the peripheral wall of the hole of the second member without remaining a space between the radially expanded portion and the peripheral wall of the hole of the second member.

3. The fastening structure according to claim 1, wherein a recess portion is defined by a radially increased portion of an inside diameter of the tubular projecting portion.

4. The fastening structure according to claim 3, wherein the radially increased portion includes a uniform bore diameter in an axis line direction of the tubular projecting portion.

5. The fastening structure according to claim 1, wherein the leading end of the tubular projecting portion is located in the hole of the second member and does not project from an other surface of the second member located in an opposite side of one surface of the second member facing to the one surface of the first member.

6. The fastening structure according to claim 1, wherein the leading end of the tubular projecting portion projects to an outward of the second member from an other surface of the second member located in an opposite side of one surface of the second member facing to the one surface of the first member, and an outer diameter in the projecting portion is larger than a bore diameter of the hole of the second member.

7. The fastening structure according to claim 1, wherein the fastening member includes a flange portion at one end of the threaded portion, the threaded portion is screwed into the tubular projecting portion from the leading end of the tubular projecting portion such that the flange portion is located on another surface side of the second member located on an opposite side of one surface of the second member facing the one surface of the first member, and the second member is thereby sandwiched between the flange portion of the fastening member and the one surface of the first member.

8. The fastening structure according to claim 7, wherein the leading end of the tubular projecting portion projects to an outward of the second member from the other surface of the second member, an outer diameter in the projecting portion is larger than a bore diameter of the hole of the second member, and the projecting portion is sandwiched between the flange portion and the other surface of the second member.

9. The fastening structure according to claim 7, wherein the leading end of the tubular projecting portion projects outward of the second member from the other surface of the second member, an outer diameter in the projecting portion is larger than a bore diameter of the hole of the second member, and the flange portion is formed with a concave portion for accepting the projecting portion of the tubular projecting portion.

10. The fastening structure according to claim 9, wherein a closed space is formed by the concave portion of the flange portion and the other surface of the second member on which the flange portion abuts.

11. The fastening structure according to claim 1, wherein a plurality of slits extending along an axis of tubular projecting portion are provided at intervals along a periphery of the tubular projecting portion.

* * * * *